Dec. 12, 1961  E. A. STALKER  3,012,754
BLADED ROTOR FOR COMPRESSORS, TURBINES, AND THE LIKE
Filed June 20, 1958  3 Sheets-Sheet 1

INVENTOR.
Edward A. Stalker

Dec. 12, 1961  E. A. STALKER  3,012,754
BLADED ROTOR FOR COMPRESSORS, TURBINES, AND THE LIKE
Filed June 20, 1958  3 Sheets-Sheet 2

INVENTOR.
Edward A. Stalker

Dec. 12, 1961     E. A. STALKER     3,012,754
BLADED ROTOR FOR COMPRESSORS, TURBINES, AND THE LIKE
Filed June 20, 1958     3 Sheets-Sheet 3

INVENTOR.
Edward A. Stalker

United States Patent Office 3,012,754
Patented Dec. 12, 1961

3,012,754
BLADED ROTOR FOR COMPRESSORS, TURBINES, AND THE LIKE
Edward A. Stalker, 406 N. Farragut St., Bay City, Mich.
Filed June 20, 1958, Ser. No. 743,393
5 Claims. (Cl. 253—77)

My invention relates to bladed rotors for axial flow machines such as compressors and turbines.

An object of my invention is to provide a low cost bladed rotor.

Another object is to provide a light weight rotor.

Still another object is to provide a sheet metal rotor hub adapted to support simple low cost blades.

Other objects will appear from the specification, appended claims, and accompanying drawings.

The above objects are accomplished by the means illustrated in the accompanying drawings in which—

FIG. 10a is a spanwise section of the blade only on line 10a—10a in FIG. 9;

Figure 2:
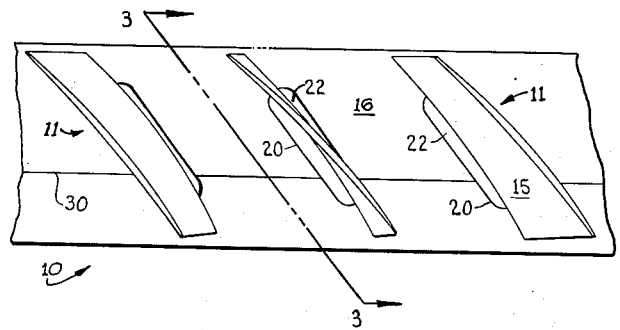
FIG. 2 is a fragmentary radial view of the rotor of FIG. 1.

The rotors provided by the subject invention have blades which are economical to produce and they cooperate with a rotor hub to provide a light weight and cheap method of attachment.

The rotor is light since there is no heavy solid rim which is slotted to receive heavy blade bases. Large centrifugal loads are thus eliminated from the structure and it can be readily made of hollow sheet metal construction.

The blades are of solid construction so that they can be readily rolled or coined to shape from a simple blank, preferably from sheet metal, such as a strip. The blades are preferably twisted.

The blades increase in thickness at the rim of the hub providing a fillet whose concave surfaces fair with the rim surface. Thus a cheap fillet is produced where the blades are brazed to the rim. This is a cheaper and much more effective fillet than one built up from braze. In fact for blades of substantial size, a braze fillet is too small for a long blade life.

The thickness of the blade at the fillet is continued radially inward over the root body to provide strength particularly at the tenons which are secured in the holes in the side disks. The root bodies are lightened at proper areas by holes and recesses.

In another form of the invention the blades have constant cross sections throughout.

Referring to the drawings the rotor is indicated generally by 10. It is comprised of the blades 11 and the axially spaced radially extending walls 12 and 14. The latter are preferably the side disks of the rotor hub.

Figures 1, 3:
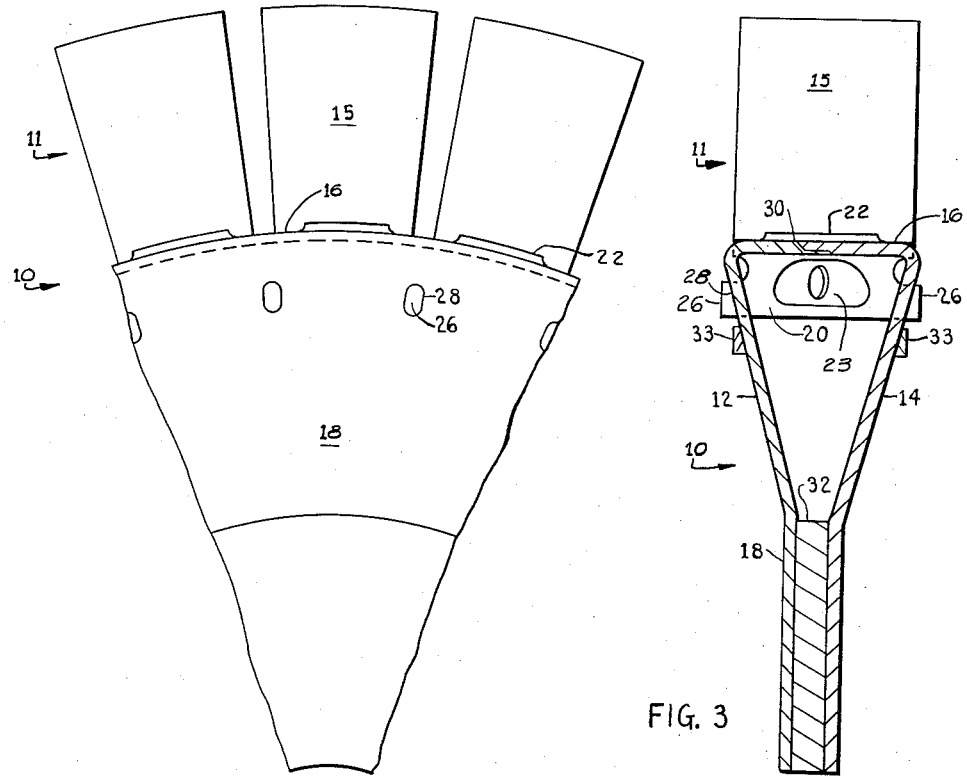
FIG. 1 is a fragmentary axial view of a rotor according to the subject invention.
FIG. 3 is a fragmentary section on line 3—3 in FIG. 2.
Figure 7:
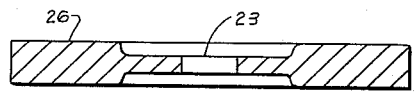
FIG. 7 is a section on line 7—7 in FIG. 4.
Figure 6:
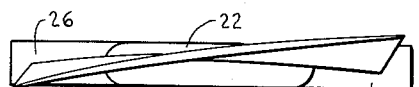
FIG. 6 is a tip view of the blade of FIG. 4.
Figure 7A:
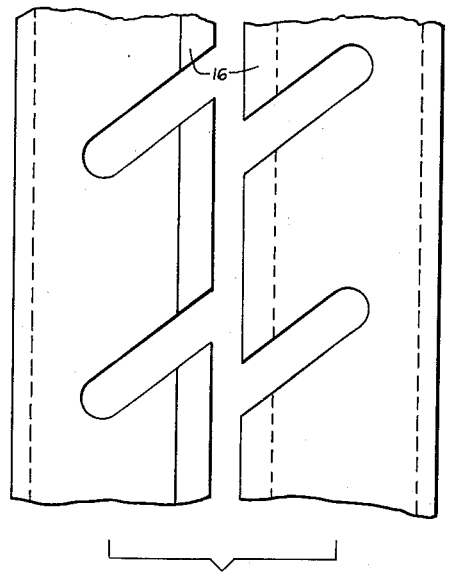
FIG. 7a is an exploded radial view of a fragment of the hub rim.
Figure 4:
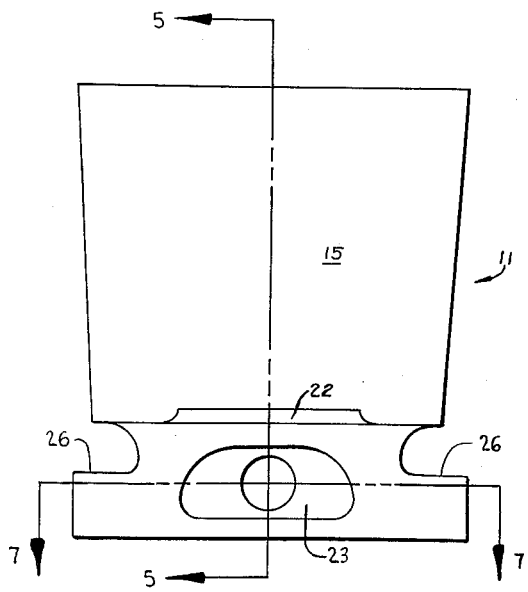
FIG. 4 is a side view of a rotor blade according to the subject invention.
Figure 5:
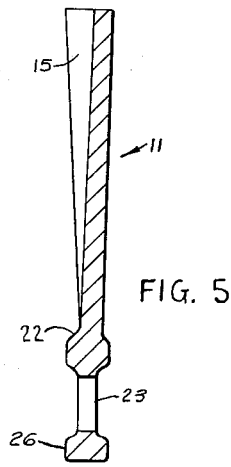
FIG. 5 is a section on line 5—5 in FIG. 4.

The blades are of solid construction. They comprise the blade body 15 extending radially outward from the rim 16 of the rotor hub means 18 and the integral blade root body 20 thicker than the blade body defining the fillets 22. These fillets fair with the outer surface of the rim and serve to reduce stress concentration where the blade passes through the rim. The blades are solid so that they are readily made by rolling, coining and the like. They are lightened at 23 by a recess and a hole. See FIGS. 3, 4 and 7.

The root body has the tenons 26 at the front and rear of the blade projecting into the holes 28 in the side disks in closely fitting relation to the surfaces of the holes so that they can be bonded therein by braze.

The surface of the tenon bearing on the disk within the disk hole is directed chiefly in the chordwise direction. This surface is the radially inwardmost side of the recess. Thus the tenon can sustain the radial loads without a tendency to slip out of the hole.

The side disks are radially extending axially spaced metal walls preferably of sheet metal. They have a dish-like shape with conical portions to provide stability to the portions inward of the periphery. Each side disk has axially directed flange segments at its periphery which define notches therebetween conforming in shape to the cross sections of the blades when the segments are brought into registration at their joints 30.

The disks are preferably bonded together with a reinforcing disk 32 to provide for attachments to a shaft or other driving means.

A ring 33 of tapered cross section is bonded to the outside surfaces of the side disks to relieve the peripheral stress at the tenons for use when the tip speeds of the blades are especially large. This is important since the peripheral stress in the disk adjacent its periphery will tend to put the braze joints in tension on the sides of the tenons in the holes in the disks. Brazing material should be in shear to carry substantial forces. Rings 33, by increasing the thickness of the disks reduce the stress in the parts of the disk radially outward of the rings.

The disks are preferably of sheet metal formed to shaped by dies. Thus each side disk can be made very cheaply by a stroke of a press. The sheet metal construction also lends itself to quick production of the spaced holes near the perimeters of the disks since these can be punched by simple dies.

In another form of the invention shown in FIGS. 8–12 the blades 78 are cut out at their edges defining the recesses 80 and 82 and the tenons 84 and 86. The outer portions of the side disks are received in the recesses and the tenons in the holes in the side disks 83 and 85 with the latter substantially flush with the leading and trailing edge of the blades.

The blades each have the same blade sections along the span of the blade from the tip radially inward of the rim so that a blade strip can be rolled and the blades cut from it according to the length required. This is a cheap method of producing blades.

The tenons comprises the blade portions reinforced by the bands 87 and 88 bonded to the root body preferably by braze extending over the whole areas thereof fayed by the bands. This construction is clearly shown in FIGS. 9–11. The tenons are given parallel sides by making the opposite bands parallel where they enter the holes in the side disks. Crevices between the curved contours of the blades and the bands are filled with braze.

Figure 8:
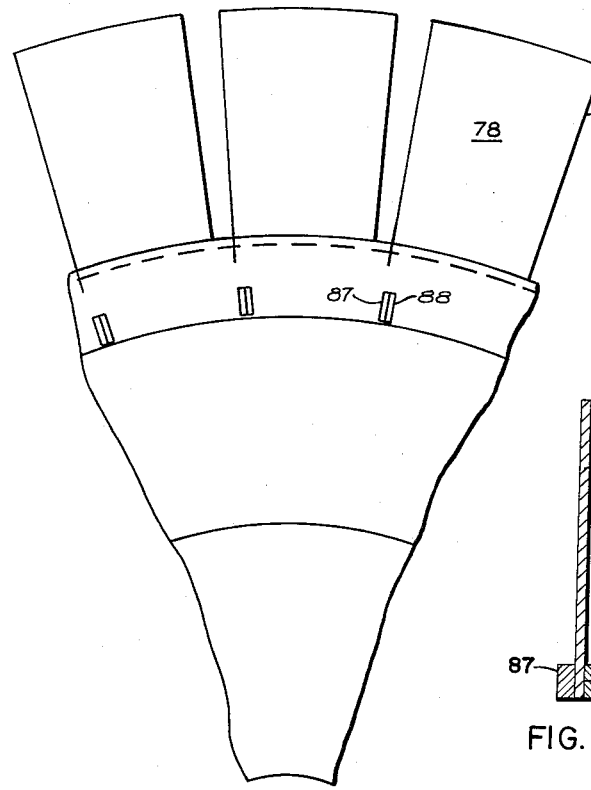
FIG. 8 is a fragmentary axial view of another rotor according to the subject invention.
Figure 9:
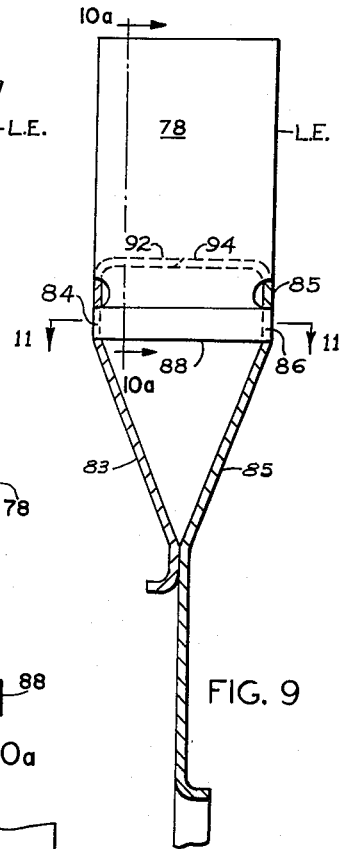
FIG. 9 is a fragmentary axial section on line 9—9 in FIG. 12.
Figure 10:
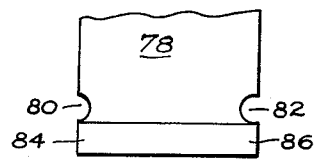
FIG. 10 is a fragment of the blade in FIG. 9 isolated from the hub.
Figure 11:
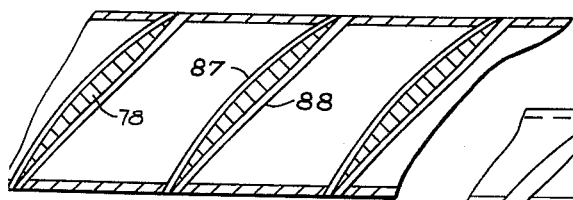
FIG. 11 is a fragmentary section on line 11—11 in FIG. 9.
Figure 12:
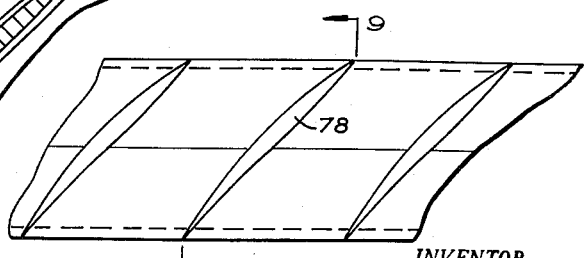
FIG. 12 is a fragmentary developed radial view of the blades and rim of the rotor of FIG. 12.

The rim means is preferably comprised, as shown in FIGS. 8 and 9, of two rim segments 92 and 94 projecting axially between the blades. These are fixed together near the locality of maximum thickness of the blades by a brazed joint.

It will now be clear that I have disclosed new and useful rotors. They incorporate the great advantages of low cost and light weight while providing exception strength particularly against fatigue by virtue of their integral fillets. The simple yet strong method of attachment of the blades to the side disks leads to low cost production. The availability of the joints for simple inspection technic as by a penetrant and ultraviolet light (according to a well known-commercial process of inspection) assures a sound and safe structure and low cost.

While I have illustrated specific forms of the invention, it is to be understood that variations may be made therein and that I intend to claim my invention broadly as indicated by the appended claims.

I claim:

1. In combination in an axial flow rotor for compressors, turbines, and the like, spaced generally circular radial walls, a plurality of peripherally spaced blades received between said walls and having leading and trailing edges extending radially outward beyond the perimeters thereof, each said blade having recesses at the leading and trailing edges thereof respectively extending axially inward from said leading and trailing edges respectively defining securing tenons directed chiefly chordwise adjacent said edges and rim means carried in said rotor adjacent said perimeters and extending from front to rear and from blade to blade to sustain variations in fluid pressure, each said blade being of solid construction increasing in thickness radially inward of said rim means over said tenons, each said wall having a plurality of peripherally spaced holes each receiving a said tenon thereinto in closely fitting relation thereto with said walls received into said recesses to be substantially axially inward of said blade leading and trailing edges, the radially inwardmost side of said recess being directed chiefly chordwise defining a chiefly chordwise directed bearing surface of said tenon at the radially outward edge thereof for bearing substantially normal to a said wall at said hole therein, and means within said holes fixing said tenons to said walls.

2. In combination in an axial flow rotor for compressors, turbines, and the like, spaced generally circular radial walls, a plurality of peripherally spaced solid blades received between said walls and having leading and trailing edges extending radially outward beyond the perimeters thereof, each said blade having recesses at said leading and trailing edges extending axially inward thereof defining securing tenons, each said wall having a plurality of peripherally spaced holes each receiving a said tenon thereinto in closely fitting relation thereto with said walls received into said recesses to be substantially flush with said edges, each said blade having the same airfoil section radially inward along the radial length of said blade from substantially the tip thereof radially inward through said rim means over said tenons to provide a cheaply made blade, and a reinforcing band bonded to said blade on a side thereof and extending over said tenons to increase the thickness and strength thereof adjacent said edges, means within said holes fixing said tenons to said walls, and rim means carried in said rotor adjacent said perimeters and extending from front to rear and from blade to blade to sustain variations in fluid pressure.

3. In combination in an axial flow rotor for compressors, turbines, and the like, spaced generally circular radial walls, a plurality of peripherally spaced blades received between said walls and having leading and trailing edges extending radially outward beyond the perimeters thereof, each said blade having recesses at the leading and trailing edges thereof respectively extending axially inward from said leading and trailing edges defining securing tenons adjacent each said edge, and rim means carried in said rotor adjacent said perimeters and extending from front to rear and from blade to blade to sustain variations in fluid pressure, each said blade being of solid construction increasing in thickness along concave surfaces at said rim means defining a fillet fairing with the rim surface of said rim means between said blades, said increased thickness extending radially inward of said rim means over said tenons, each said wall having a plurality of peripherally spaced holes each receiving a said tenon thereinto in closely fitting relation thereto with said walls received into said recesses to be substantially axially inward of said blade leading and trailing edges, means within said holes fixing said tenons to said walls.

4. In combination in an axial flow rotor for compressors, turbines, and the like, spaced radial walls, a plurality of peripherally spaced blades received between said walls and extending radially outward beyond the perimeters thereof, rim means carried in said rotor adjacent said perimeters and extending from front to rear and from blade to blade to sustain variations in fluid pressure, each said blade having a securing tenon at front and rear thereof, each said blade being of solid construction increasing in thickness along concave surfaces at said rim means defining a fillet fairing with the surface of said rim means between said blades, said increased thickness extending radially inward of said rim means over said tenons, said spaced walls each having a plurality of peripherally spaced holes adjacent the perimeters thereof each receiving a said tenon of thickness thereinto, and means fixing said tenons to said walls.

5. In combination in an axial flow rotor for compressors, turbines, and the like, spaced generally circular radial walls, a plurality of peripherally spaced solid blades received between said walls and having leading and trailing edges extending radially outward beyond the perimeters thereof, each said blade having radially spaced recesses at said leading and trailing edges extending axially inward thereof defining securing tenons, each said wall having a plurality of peripherally spaced holes each receiving a said tenon thereinto in closely fitting relation thereto with said walls received into said recesses to be substantially flush with said edges, means within said holes fixing said tenons to said walls, and rim means carried in said rotor adjacent said perimeters and extending from front to rear and from blade to blade to sustain variations in fluid pressure, each said blade having the same airfoil section radially inward along the radial length of said blade from substantially the tip thereof radially inward through said rim means over said tenons to provide a cheap blade.

References Cited in the file of this patent

UNITED STATES PATENTS

| | | |
|---|---|---|
| 886,515 | Jude | May 5, 1908 |
| 1,325,208 | Rice | Dec. 16, 1919 |
| 2,819,869 | Meyer | Jan. 14, 1958 |

FOREIGN PATENTS

| | | |
|---|---|---|
| 724,123 | Great Britain | Feb. 16, 1955 |
| 728,754 | Great Britain | Apr. 27, 1955 |
| 740,757 | Great Britain | Nov. 16, 1955 |
| 757,980 | Great Britain | Sept. 26, 1956 |
| 846,035 | Germany | Aug. 7, 1952 |